United States Patent
Bohl et al.

[11] Patent Number: 5,411,005
[45] Date of Patent: May 2, 1995

[54] EMISSIONS AND FUEL CONTROL SYSTEM AND DEVICE

[76] Inventors: Michael E. Bohl, P.O. Box 606, Williamsburg, Ohio 45176; Robert A. Glass, 2504 Jett Hill Rd., New Richmond, Ohio 45157

[21] Appl. No.: 78,004
[22] Filed: Jun. 15, 1993
[51] Int. Cl.$^6$ ............................................. F02M 31/00
[52] U.S. Cl. ........................................................ 123/557
[58] Field of Search ............... 123/557, 549, 545, 552, 123/547; 161/41, 43, 47

[56] References Cited

U.S. PATENT DOCUMENTS

| | | | |
|---|---|---|---|
| 1,168,111 | 1/1916 | Pope | 123/557 |
| 4,231,342 | 11/1980 | Johnston | 123/557 |
| 4,326,491 | 4/1982 | Burchett | 123/557 |
| 4,349,001 | 9/1982 | Wagner et al. | 123/557 |
| 4,385,615 | 5/1983 | Keane | 123/557 |
| 4,397,288 | 8/1983 | Kelling | 123/557 |
| 4,432,329 | 2/1984 | Redele | 123/557 |
| 4,475,523 | 10/1984 | Goranflo | 123/557 |
| 4,700,047 | 10/1987 | Crossett et al. | 123/549 |
| 4,841,943 | 6/1989 | Favreau et al. | 123/557 |
| 4,858,584 | 8/1989 | Bridgeman | 123/557 |
| 4,862,951 | 9/1989 | Muller et al. | |
| 4,944,343 | 7/1990 | Muller | 165/47 |
| 4,979,483 | 12/1990 | Ray | 123/557 |
| 4,984,555 | 1/1991 | Husang | 123/545 |
| 5,005,551 | 4/1991 | McNelley | 123/557 |
| 5,099,909 | 3/1992 | Barigelli . | |
| 5,156,135 | 10/1992 | Snyder | 123/557 |

FOREIGN PATENT DOCUMENTS 3740811 6/1989 Germany ............................ 123/557

Primary Examiner—E. Rollins Cross
Assistant Examiner—M. Macy

[57] ABSTRACT

A fuel heating system which employs an improved heat exchanger for reducing particulate emissions in diesel or kerosene fuel powered internal combustion engines. The fuel heating system encompasses an internal combustion engine having a fuel line, a cooling system having a coolant line, and the novel heat exchanger of this invention. The heat exchanger has a container for holding heated coolant to provide a heat source for the fuel. A helical fuel tube extends the length of the container, with its inlet and outlet ports located in close proximity at the same end of the container. The coolant inlet and outlet ports are located on opposite ends of the container, with the coolant inlet port located on the same end of the container as the fuel ports. The coolant outlet port is located at a higher elevation than the coolant inlet port to prevent air lock. The coolant ports are connected into the coolant system of the internal combustion engine, while the fuel ports are connected into the fuel line ultimately leading to the fuel injectors. The fuel reaches a maximum temperature of about 85° F. which allows a reduction of particulate emissions of up to about 78%. An optional electric resistance heater may be used to heat fuel for starting a cold engine.

12 Claims, 3 Drawing Sheets

EMISSIONS AND FUEL CONTROL SYSTEM AND DEVICE

BACKGROUND OF THE INVENTION

1. Field of the Invention

This invention relates generally to a heating system for internal combustion engines powered by diesel or kerosene fuel, and more particularly, this invention relates to an apparatus which is used to heat the fuel to a desired temperature for increased efficiency and reduction of particulate emissions.

2. Related Art

The heating of diesel or kerosene fuel prior to use in the combustion chamber of internal combustion engines is well known for preventing gelling of paraffin during cold weather which clogs the engine's filter system. It is also known that preheating fuel increases fuel volume due to thermal expansion, thus the engine's efficiency is improved. However, current fuel heaters have focused on preventing gelling problems in internal combustion engines for tractor-trailer type vehicles with the reduction of particulate emissions being a welcome side effect. In light of today's environmental consciousness, improved methods of reducing particulate emissions are needed.

Current fuel heaters are cumbersome and difficult to install. Frequently, heaters require complicated engine modifications such as rerouting fuel and coolant lines. Generally, user adjustments are required during operation of the heater.

It is critical that the coolant medium does not contaminate the fuel. Some fuel heaters are designed in such a manner that only a welded joint is responsible for separating the fuel and coolant medium. Thus, it is possible for the fluids to mix upon failure of the welded portion.

Current fuel heaters, designed primarily to eliminate gelling of fuel, are restrictive flow devices. Thermostats, valves, and small diameter coils employed in fuel heaters restrict fuel flow, require user involvement, and experience frequent break downs. Because of their restrictive elements, fuel heaters are prevented from heating fuel to a temperature sufficient to maximize an engine's efficiency and reduce particulate emissions to the greatest extent possible.

An additional problem associated with current fuel heaters is the problem of air lock. Air lock occurs when air is trapped in the coolant container such that heated coolant is prevented from entering the container. Often, fuel heaters are responsible for introducing air into the fuel line. Air lock interrupts the operation of the heat exchanger, preventing a steady and adequate supply of heated fuel from reaching the engine such that the engine may stall.

Because current fuel heaters are solely designed to eliminate gelling problems, they are not capable of maximizing an engine's efficiency for improved reduction of particulate emissions. Also, current fuel heaters are accompanied by user inconvenience and air lock problems. Thus, an improved fuel heater is needed that further reduces particulate emissions, eliminates user involvement, is easy to install and maintain, provides minimal disruption of the existing engine, and can be made for installation in any type of vehicle.

Accordingly, this invention satisfies the shortcomings of the existing art as described above. It is an object of the invention to provide a heating system for fuel which maximizes the reduction of particulate emissions; increases engine efficiency; heats fuel to a predetermined temperature; and prevents gelling problems.

It is another object of this invention to provide a heat exchanger device which maximizes the reduction of particulate emissions; increases engine efficiency; may be used on any type of engine which utilizes diesel or kerosene fuel; prevents the possibility of mixing the fuel and the cooling medium; heats fuel to a predetermined temperature; is easy to install and maintain; may be easily moved from vehicle to vehicle; eliminates breakdowns; prevents air lock of the heat exchanger; is inexpensive to manufacture; and provides a surplus of heated fuel for improved efficiency and for times of increased fuel demand.

SUMMARY OF THE INVENTION

The present invention provides an improved fuel heating system for reducing particulate emissions which employs an improved heat exchanger. The fuel heating system comprises an internal combustion engine, a coolant system, and an improved heat exchanger. The heat exchanger comprises a container, a helical coil located in the container, and inlet and outlet ports located on the ends of the container. In addition, an optional electrical resistance heater can be inserted through an end of the container for preheating the fuel.

The heat exchanger is installed within the coolant system and the engine fuel lines. Heated coolant from the engine coolant jacket is directed to the container. The coolant enters the container through a coolant inlet port which is located on an end of the container. The helical coil passes fuel through the heated coolant in the container. Fuel is admitted to the coil from a fuel tank and a fuel inlet line. The fuel passes through a fuel inlet port adjacent the coolant inlet port on the container end nearest the fuel tank. The fuel is directed out of the coil through a fuel outlet port which is adjacent the fuel inlet port and the coolant inlet port. The close proximity of the ports provides less disruption to the engine's coolant and fuel lines.

The coolant exits the container through a coolant outlet port located on an end of the container opposite the coolant inlet port end. The coolant outlet port is located at a higher elevation than the coolant inlet port to prevent air lock problems. The coolant returns to the engine coolant jacket for recirculation through the system. In addition, a threaded port with a plug tap is adjacent the coolant outlet port for insertion of an optional electrical resistance heater for providing heated fuel at the start up of the engine.

A person of ordinary skill in the art may readily adapt this invention for use on any type of diesel or kerosene powered engine which employs a coolant system including, but not limited to automobiles, railroad locomotives, marine diesels, and military tanks.

Heated fuel allows for a more complete atomization of the fuel into the combustion chambers of the engine. This allows for a more complete and efficient burn of the fuel, thereby reducing particulate emissions, increasing engine efficiency, and increasing mileage.

The present invention is completely passive both to the fuel system as well as to the coolant system. The design is basically maintenance free such that adjustments or changes during the operation of the invention are unnecessary. The invention does not have to be engaged by the user, it operates when the engine is running. As the engine runs, the fuel which is not used by the engine is bypassed back to the fuel tank. The coil diameter is larger than the vehicle fuel line to permit a reservoir of warmed fuel during times of increased engine load. This warms the fuel in the tank as well. The more economical #2 fuel may be used throughout the year due to the performance of this invention.

DETAILED DESCRIPTION OF THE PREFERRED EMBODIMENT

Figure 1:
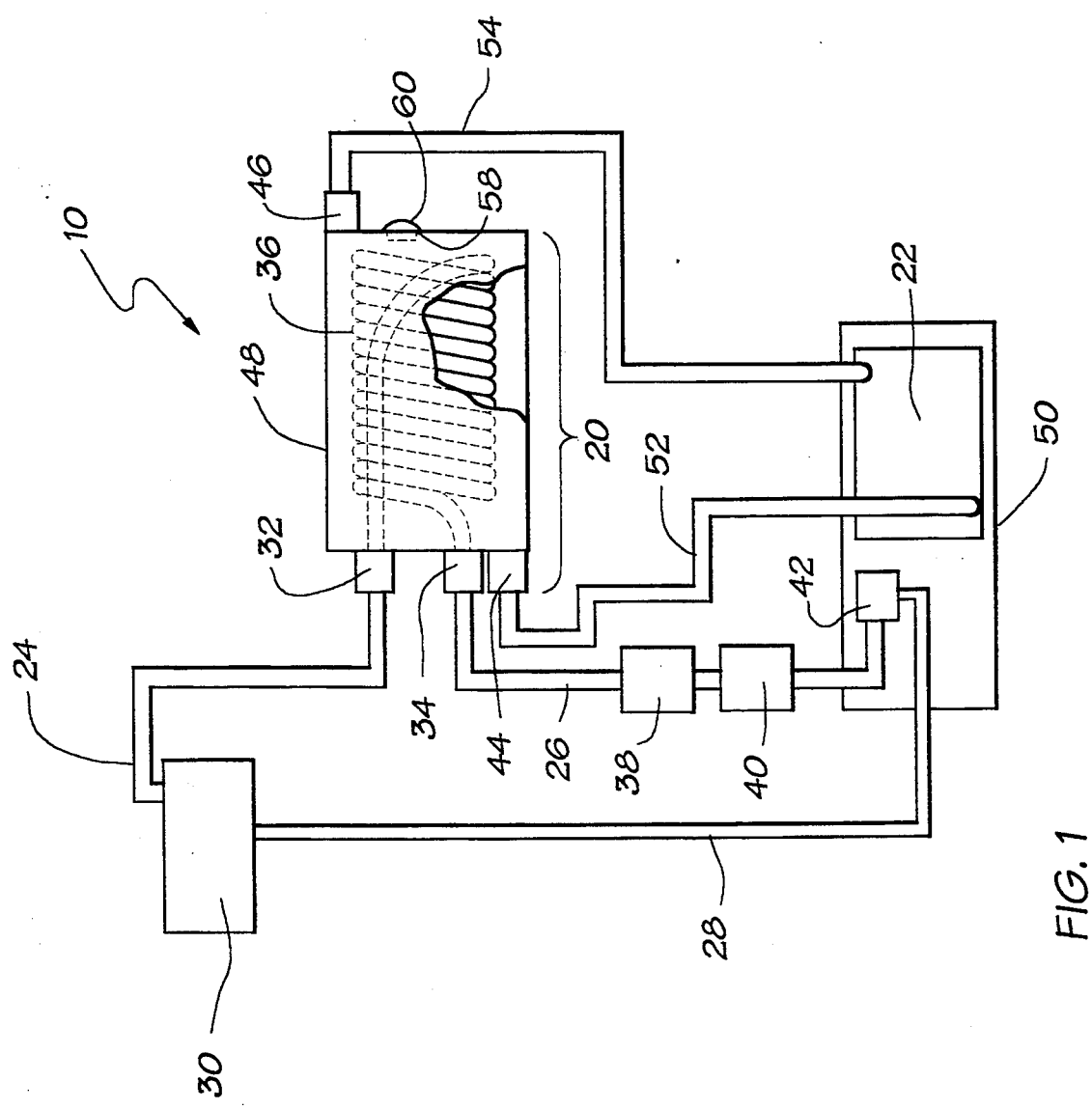
FIG. 1 is a schematic diagram view of the system for heating fuel including an internal combustion engine, cooling system, and heat exchanger for reducing particulate emissions.
Figure 2:
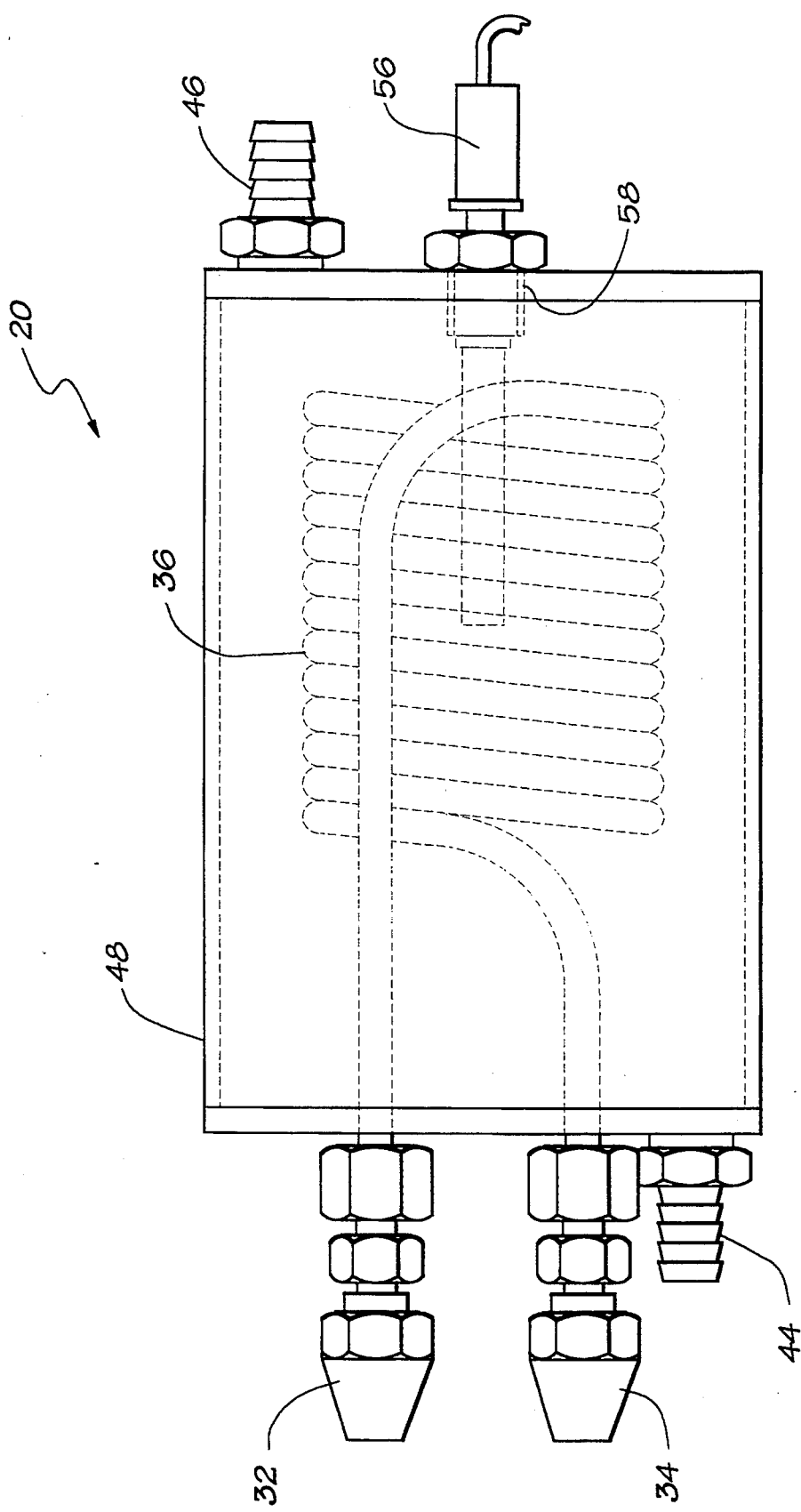
FIG. 2 is a close up view of the heat exchanger of FIG. 1 showing the electric resistance heater.
Figure 3:
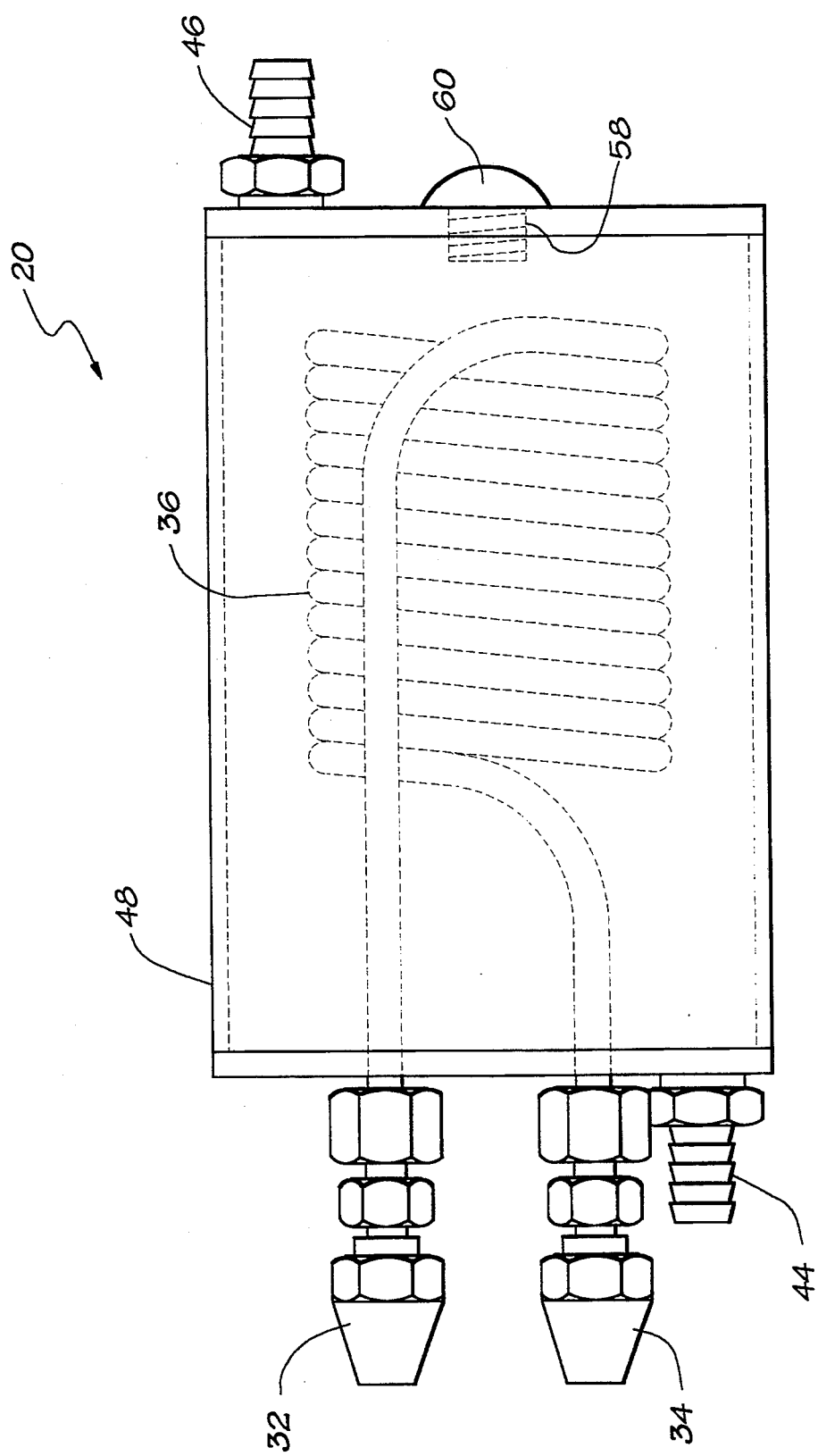
FIG. 3 is a close up view of the heat exchanger of FIG. 1 without the electric resistance heater.

As shown in FIGS. 1-3, the present invention is a system for heating fuel generally designated number (10). The system (10) includes a heat exchanger generally designated (20).

Fuel travels through a fuel inlet line (24) which connects a fuel tank (30) for containing fuel, to the heat exchanger (20) where the fuel is heated. Heated fuel exits the heat exchanger (20) through a fuel outlet line (26) which is connected to the heat exchanger (20) and a filter (38). After passing through the filter (38), the fuel outlet line (26) directs the fuel to a pump (40) and then to fuel injectors (42). Excess heated fuel travels from the injectors (42) through a bypass line (28) to the fuel tank (30) where it warms fuel in the fuel tank (30).

Coolant, heated in an engine coolant jacket (50), passes through a coolant inlet line (52) to the heat exchanger (20) where it will transfer its heat to the fuel. Upon exiting the heat exchanger (20), the coolant passes through a coolant outlet line (54) and returns to the engine coolant jacket (50).

The heat exchanger (20) comprises a container (48) for holding heated coolant, a helical coil (36) is located in the container (48) for heating fuel by passing it through the container (48) of heated coolant, a coolant inlet port (44) is located on an end of the container (48) for admitting coolant into the container (48), a coolant outlet port (46) is located at the opposite end of the container (48) for discharging the coolant, a fuel inlet port (32) is located adjacent the coolant inlet port (44) on the container (48) end for admitting fuel into the coil (36), a fuel outlet port (34) is located adjacent the fuel inlet port (32) on the end of the container (48) for discharging fuel out of the coil (36), a threaded port (58) is located adjacent the coolant outlet port (46) on the end of the container (48) for receiving an optional electric resistance heater (56), and a threaded plug cap (60) is secured to the threaded port (58) for sealing the threaded port (58) when the electric resistance heater (56) is not being used. Fuel enters the helical coil (36) through the fuel inlet port (32) from the fuel inlet line (24). The fuel is retained in the helical coil (36) for a length of time sufficient for the coolant in the container (48) to heat the fuel to a maximum temperature of about 85° F. After heating, fuel exits the coil (36) through the fuel outlet port (34) to the fuel outlet line (26).

The diameter of the helical coil (36) is greater than the diameter of the fuel lines (24, 26) providing excess heated fuel for periods of heavy engine load. Unused excess heated fuel is channeled back to the fuel tank (30) through the bypass line (28), providing for even heating of the fuel and the prevention of hot and cold striations from forming in the fuel. The helical coil (36) provides maximum transfer of heat from the heated coolant to the fuel by generation of maximum turbulence and fluid shear in the coil (36) caused by the action of the fuel moving through the helically shaped coil. One skilled in the art may readily select a suitable coil size to provide a sufficient amount of heated fuel for any size diesel engine. The size of the heat exchanger may be designed for any application and the thermal transfer from coolant to fuel is determined by the following equation:

$$Q = K[(K(t_2 - t_1)aT)/d]$$

Where:

$t_2 - t_1$ is the temperature gradient;

K is a constant dependent on the coil material;

d is the thickness of the coil material; and

T is the time required.

The amount of heat transfer is determined separately for the coolant to a coil and for the coil to the diesel fuel. This determines the amount of dwell time required for the fuel within the coil. The fuel flow combined with the dwell time in the unit gives the amount of temperature increase of the fuel flowing through the heat exchanger. Likewise, knowing the fuel flow and the heat transfer, one can determine the size of the coil as a function of the required dwell time. Thus, the unit may be sized for any application.

The coolant should be heated by the engine to at least about 180° F. up to about 195° F. The heated coolant is routed into the container (48) from the coolant inlet line (52) through the coolant inlet port (44). Coolant fills the container (48) such that the helical coil (36) is completely surrounded with heated coolant. Preferably, the coolant outlet port (46), through which coolant exits the container (48) to the coolant outlet line (54), is located at a higher elevation than the coolant inlet port (44) so that the container (48) fills in a manner such that the coil (36) is submerged in heated coolant. This preferred arrangement of the coolant inlet and outlet ports (44, 46) insures that air lock will not interrupt operation of the heat exchanger (20) so that the fuel is continually being heated.

All of the ports (32, 34, 44, 46) are designed for unrestricted flow without thermostats or valves. Thus, the heat exchanger (20) of the present invention should be used with an engine (22) that employs a standard thermostat which allows the coolant to be heated between about 180° F. to about 195° F., in order to heat the fuel sufficiently. This invention improves engine efficiency by utilizing the engine's thermostat (not shown) rather than supplying an additional restrictive element. If the fuel temperature reaches 85° F., fuel volume is increased by approximately 8.5%. This increase in fuel volume can improve reduction of particulate emissions by up to 78% and improve mileage of a vehicle by up to 15% over fuel that is not heated.

One of the advantages of the present invention is the ease and convenience of installation due to reduced disruption of the existing fuel lines of an engine. Thus, it is preferable for both the fuel inlet port (32) and the fuel outlet port (34) to be located on the same end of the container (48). Preferably, the fuel ports (32, 34) are located on the end of the container (48) closest to the fuel tank (30) so that disruption of the existing fuel lines (24, 26) is minimized. Preferably, the coolant inlet port (44) is located on the same end of the container (48) as the fuel ports (32, 34). Whereas, the coolant outlet port (46) is located on the end of the container (48) opposite the coolant inlet port (44).

The optional electric resistance heater (56), preferably a 300 watt 120 volt cartridge heater, may be used for heating the fuel in the coil (36) to start the engine or to maintain fuel flow during periods of nonuse. The heater (56) is installed by removing the threaded plug tap (60) in the threaded port (58) and installing the heater (56) into the threaded port (58). The electric resistance heater (56) extends into the center of the coil (36). The electric resistance heater (56) eliminates the need for starting fluids or other starting aids during periods of low ambient temperatures. Also, the electric resistance heater (56) may be used instead of idling the engine (22) to prevent gelling during periods in between use; thus, providing further reduction of particulate emissions because the engine may be turned off.

In order to contribute to a better understanding of the preferred embodiment of this invention and not by way of limitation, the following example is provided.

EXAMPLE 1

A 400 Cummins engine was used and a fuel flow of 15.75 gallons per hour was used as the base determination for fuel flow through the unit. The temperature of the coolant entering the unit was 185° F. to 190° F. The volume of a copper coil was 0.153 gallons, and time of dwell in the coil was 38.25 seconds. Due to the transfer of heat, the fuel volume increased by approximately 8.5%. This preferred embodiment demonstrated increased engine efficiency by improving the reduction of particulate emissions of up to 78%, and increasing mileage of up to 15% compared to the same engine utilizing unheated fuel.

While a particular embodiment of the present invention has been illustrated and described, it would be obvious to those skilled in the art that various other changes and modifications can be made without departing from the spirit and scope of the invention. It is, therefore, intended to cover in the appended claims all such changes and modifications that are within the scope of this invention.

What is claimed is:

1. A fuel heating system for maximizing engine efficiency and reducing diesel engine particulate emissions, comprising:
   an internal combustion engine, said engine having a fuel line;
   a cooling system having a coolant line for recirculation of liquid coolant through said engine; and
   a heat exchanger for heating said fuel to a maximum of about 85° F.

2. The fuel heating system of claim 1 wherein said heat exchanger separately forms a portion of said fuel line and said coolant line such that only coolant ranging from about 180° F. to about 195° F. passes through said heat exchanger to heat said fuel.

3. A heat exchanger for maximizing engine efficiency and reducing diesel engine particulate emissions, comprising:
   a container for holding heated coolant;
   a helical coil for passing fuel through said container, said coil located in said container and having a first end and a second end;
   a coolant inlet port for admitting heated coolant into said container from a coolant line, said coolant inlet port located on an end of said container;
   a coolant outlet port for transporting coolant out of said container and located opposite said coolant inlet port and at an elevation higher than said coolant inlet port;
   a fuel inlet port for admitting fuel into said coil from a fuel line, said fuel inlet port is located on an end of said container and connected to said first end of said coil; and
   a fuel outlet port for transporting heated fuel out of said container into said fuel line, said fuel outlet port is located on said end of said container and adjacent said fuel inlet port and is connected to said second end of said coil, wherein said fuel is heated to a maximum of 85° F.

4. The heat exchanger of claim 3 wherein said fuel inlet port and said fuel outlet port are both located adjacent said coolant inlet port on said end of said container.

5. The heat exchanger of claim 3 wherein said coolant admitted to said container ranges from about 180° F. to about 195° F.

6. The heat exchanger of claim 3 further comprising a threaded port for receiving a resistance heater, said threaded port is located on said container end, adjacent said coolant outlet port.

7. The heat exchanger of claim 6 further comprising a resistance heater secured to said container for preheating of fuel, said resistance heater is secured to said threaded port.

8. The heat exchanger of claim 6 further comprising a plug tap for sealing said threaded port when said resistance heater is not being used.

9. A heat exchanger for maximizing engine efficiency and reducing diesel engine particulate emissions, comprising:
   a container for holding heated coolant, having a first end and a second end;
   a helical coil for passing fuel through said container, said coil located in said container and having a first end and a second end;
   a coolant inlet port for admitting heated coolant ranging from about 180° F. to about 195° F. into said container from a coolant line and is located on said container first end;
   a coolant outlet port for transporting coolant out of said container, said outlet port is located on said container second end and at an elevation higher than said coolant inlet port;
   a fuel inlet port for admitting fuel heated to a maximum of about 85° F. into said container from a fuel line, said fuel inlet port is located on said container first end of said and connected to said first end of said coil; and
   a fuel outlet port for transporting heated fuel out of said container into said fuel line, said fuel outlet port is located on said container first end and connected to said second end of said coil.

10. The heat exchanger of claim 9 further comprising a threaded port for receiving a resistance heater, said threaded port is located on said container second end adjacent said coolant outlet port.

11. The heat exchanger of claim 10 further comprising a resistance heater secured to said container for preheating of fuel, said resistance heater having threading for fitting securely in said threaded port.

12. The heat exchanger of claim 10 further comprising a plug tap for sealing said threaded port when said resistance heater is not being used.

* * * * *